(12) United States Patent
Billois

(10) Patent No.: US 12,084,148 B2
(45) Date of Patent: Sep. 10, 2024

(54) HYDROFOIL WITH VARIABLE LIFT AND DRAG FOR A WATERCRAFT

(71) Applicant: Sébastien Billois, Roscoff (FR)

(72) Inventor: Sébastien Billois, Roscoff (FR)

(*) Notice: Subject to any disclaimer, the term of this patent is extended or adjusted under 35 U.S.C. 154(b) by 0 days.

(21) Appl. No.: 18/557,203

(22) PCT Filed: Apr. 22, 2022

(86) PCT No.: PCT/EP2022/060705
§ 371 (c)(1),
(2) Date: Oct. 25, 2023

(87) PCT Pub. No.: WO2022/229020
PCT Pub. Date: Nov. 3, 2022

(65) Prior Publication Data
US 2024/0217623 A1     Jul. 4, 2024

(30) Foreign Application Priority Data
Apr. 28, 2021  (FR) ...................... 2104390

(51) Int. Cl.
*B63B 1/30*     (2006.01)
*B63B 1/24*     (2020.01)
(Continued)

(52) U.S. Cl.
CPC ................ *B63B 1/30* (2013.01); *B63B 1/242* (2013.01); *B63B 1/28* (2013.01); *B63B 1/283* (2013.01);
(Continued)

(58) Field of Classification Search
CPC ........... B63B 1/24; B63B 1/242; B63B 1/244; B63B 1/28; B63B 1/283; B63B 1/286;
(Continued)

(56) References Cited

U.S. PATENT DOCUMENTS 2,444,332 A * 6/1948 Briggs ...................... B64C 3/56
114/313
3,090,978 A * 5/1963 Hanson ................... B63B 32/30
441/79
(Continued)

FOREIGN PATENT DOCUMENTS

CN        110065609 A      7/2019
EP         1304288 A1      4/2003
(Continued)

OTHER PUBLICATIONS

International Preliminary Report on Patentability dated Mar. 31, 2023 in related/corresponding International Application No. PCT/EP2022/060705.
(Continued)

*Primary Examiner* — Ajay Vasudeva
(74) *Attorney, Agent, or Firm* — PATENT PORTFOLIO BUILDERS PLLC

(57) ABSTRACT

The invention relates to a hydrofoil for a watercraft including a fuselage and two wings arranged on either side of the fuselage and designed to provide hydrodynamic lift to the hydrofoil when it is moving through the water. According to the invention, the two wings are rotatable relative to the fuselage between a deployed position when the hydrofoil is stationary, and a retracted position towards a rear part of the fuselage by the water pressure exerted on the wings when the hydrofoil is moving through the water.

8 Claims, 3 Drawing Sheets

(51) Int. Cl.
  *B63B 1/28* (2006.01)
  *B63B 32/64* (2020.01)
  *B63B 32/66* (2020.01)

(52) U.S. Cl.
  CPC .............. *B63B 1/286* (2013.01); *B63B 32/64* (2020.02); *B63B 32/66* (2020.02)

(58) Field of Classification Search
  CPC ........... B63B 1/30; B63B 32/60; B63B 32/64; B63B 32/66; B63B 34/40
  See application file for complete search history.

(56) References Cited

U.S. PATENT DOCUMENTS

| | | | | |
|---|---|---|---|---|
| 3,195,495 A | * | 7/1965 | Erlandsen | ............... B63B 1/283 |
| | | | | 114/280 |
| 3,802,369 A | * | 4/1974 | Ishimoto | ................. B63B 34/10 |
| | | | | 440/42 |
| 4,077,077 A | * | 3/1978 | Harper | ................... B63B 32/30 |
| | | | | 114/274 |
| 4,752,262 A | * | 6/1988 | Martinmaas | ............ B63B 32/64 |
| | | | | 441/79 |
| 5,404,830 A | * | 4/1995 | Ligozio | ..................... B63B 1/30 |
| | | | | 114/280 |
| 6,886,481 B1 | | 5/2005 | Lord | |
| 2003/0089293 A1 | * | 5/2003 | Vos | ......................... B63B 1/244 |
| | | | | 114/284 |
| 2020/0331562 A1 | | 10/2020 | Dombois | |

FOREIGN PATENT DOCUMENTS

| | | |
|---|---|---|
| FR | 3049262 A1 | 9/2017 |
| IT | 20163845 A1 | 11/2017 |

OTHER PUBLICATIONS

International Search Report/Written Opinion dated Aug. 19, 2022 in related/corresponding International Application No. PCT/EP2022/060705, including partial English language translation.

* cited by examiner

HYDROFOIL WITH VARIABLE LIFT AND DRAG FOR A WATERCRAFT

BACKGROUND OF THE INVENTION

Technical Field

The invention relates to a hydrofoil for a watercraft and to a watercraft comprising such a hydrofoil.

Discussion of the Background

Watercrafts such as boats, sailboards, stand-up paddleboards, surfboards, kiteboards or windsurf boards use hydrofoils to reduce the drag of a watercraft hull as they pass through the water and to provide faster displacement.

Hydrofoils such as that shown in document FR3049262 enable the height of the watercraft's hull to be varied as a function of the speed of the watercraft through the water.

Hydrofoils comprise a fuselage, a mast designed to be attached to the watercraft, two wings at the front of the fuselage and a tail at the rear of the fuselage. The wings are designed to provide hydrodynamic lift to the hydrofoil as it moves through the water.

However, prior art hydrofoils have the disadvantage of causing drag in the water, reducing the speed of the watercraft when it reaches high speeds. The performance of watercraft is therefore limited by prior art hydrofoils.

SUMMARY OF THE INVENTION

The aim of the invention is therefore to overcome the disadvantages of the prior art by proposing a hydrofoil enabling the hydrofoil's lift and hence drag in the water to be reduced as a function of the speed of the watercraft', in order to increase the speed of the watercraft.

To this end, the invention relates, in its broadest sense, to a hydrofoil intended for a watercraft comprising a fuselage and two wings arranged on either side of the fuselage and designed to provide hydrodynamic lift to the hydrofoil when it is moving in the water.

According to the invention, the two wings are rotatable relative to the fuselage between a deployed position when the hydrofoil is stationary and a retracted position towards a rear part of the fuselage by the water pressure exerted on the wings as the hydrofoil moves through the water.

The invention thus provides a hydrofoil that reduces the hydrofoil's lift and hence drag in the water as a function of the speed of the watercraft, and more specifically as the speed of the watercraft increases.

The hydrofoil's variable-geometry wings help to reduce drag at the leading edges and therefore friction between the hydrofoil and the water. This enables the watercraft to reach higher speeds. Navigation comfort is also improved.

Advantageously, in the deployed position, the two wings are substantially perpendicular to a longitudinal axis L of the fuselage. In the retracted position, each of the two wings forms an angle with the longitudinal axis L when the speed of the hydrofoil is greater than a minimum speed. This angle is less than 90° and decreases progressively as the speed of the hydrofoil increases.

In one possible embodiment, the wings are mechanically connected to a mobile assembly that translates inside the fuselage along the longitudinal axis L and relative to the fuselage. Retracting the two wings towards the fuselage translates the mobile assembly towards a front part of the fuselage. Deploying the two wings causes the mobile assembly to move towards the rear part of the fuselage.

This mobile assembly provides a simple, robust device of movement.

Preferably, the wings comprise a first wing rotatably mounted on the fuselage around a first axis, and a second wing rotatably mounted on the fuselage around a second axis. The hydrofoil comprises connecting devices coupling the wings to the mobile assembly.

In one embodiment, the connecting devices comprise two recesses on either side of the mobile assembly, a first recess receiving an inner end of the first wing and a second recess receiving an inner end of the second wing. The inner end of the first wing forms a lever against a front portion of the first recess to push the mobile assembly towards the front part of the fuselage as the speed of the hydrofoil increases. The inner end of the second wing forms a lever against a front portion of the second recess to push the mobile assembly towards the front part of the fuselage as the speed of the hydrofoil increases.

Preferably, the hydrofoil includes compression devices connected to the mobile assembly and opposing a resisting force to a force exerted by the water pressure on the wings as the hydrofoil moves, so that the retraction of the wings is adapted to the speed of the hydrofoil.

This enables the wings to return to their initial position, i.e. the deployed position, when the hydrofoil slows down or stops. The compression devices oppose a resisting force to a force exerted by the water pressure on the wings so that the folding of the wings is adapted to the speed of the watercraft in order to obtain the best lift/drag/speed ratio.

According to an alternative, the compression devices comprise at least one spring mounted in compression between a front end of the fuselage and a front end of the mobile assembly.

This provides a robust, simple and lightweight mechanism.

According to another alternative, the mobile assembly has an elongated shape following the longitudinal axis L. The hydrofoil comprises a tail attached to a rear end of the mobile assembly so that the tail is mobile in translation between a deployed position when the wings are deployed and a retracted position towards the fuselage when the wings are retracted.

The tail can or cannot be partially retracted into the fuselage.

The overall length of the hydrofoil can be reduced by a translational movement to bring the tail linearly closer to the wings, in correlation, synergy and simultaneously with the progressive rearward orientation of the wings. This further reduces lift and drag in the water.

In another embodiment, the mobile assembly comprises a first mobile element actuated by water pressure on the first wing and a second mobile element actuated by water pressure on the second wing. The first and second mobile elements move independently of each other depending on the trajectory followed by the hydrofoil.

In this way, each wing is autonomous in the event of a change in the hydrofoil's trajectory. This makes it possible to manage the speed differential during turns. Hydrofoil performance is enhanced.

The invention also relates to a watercraft comprising at least one hydrofoil as defined above. The hydrofoil is attached to the watercraft by a mast.

BRIEF DESCRIPTION OF THE DRAWINGS

Hereinafter, by way of non-limiting examples, embodiments of the present invention will be described, with reference to the appended figures on which.

DETAILED DESCRIPTION OF THE INVENTION

Figure 1:
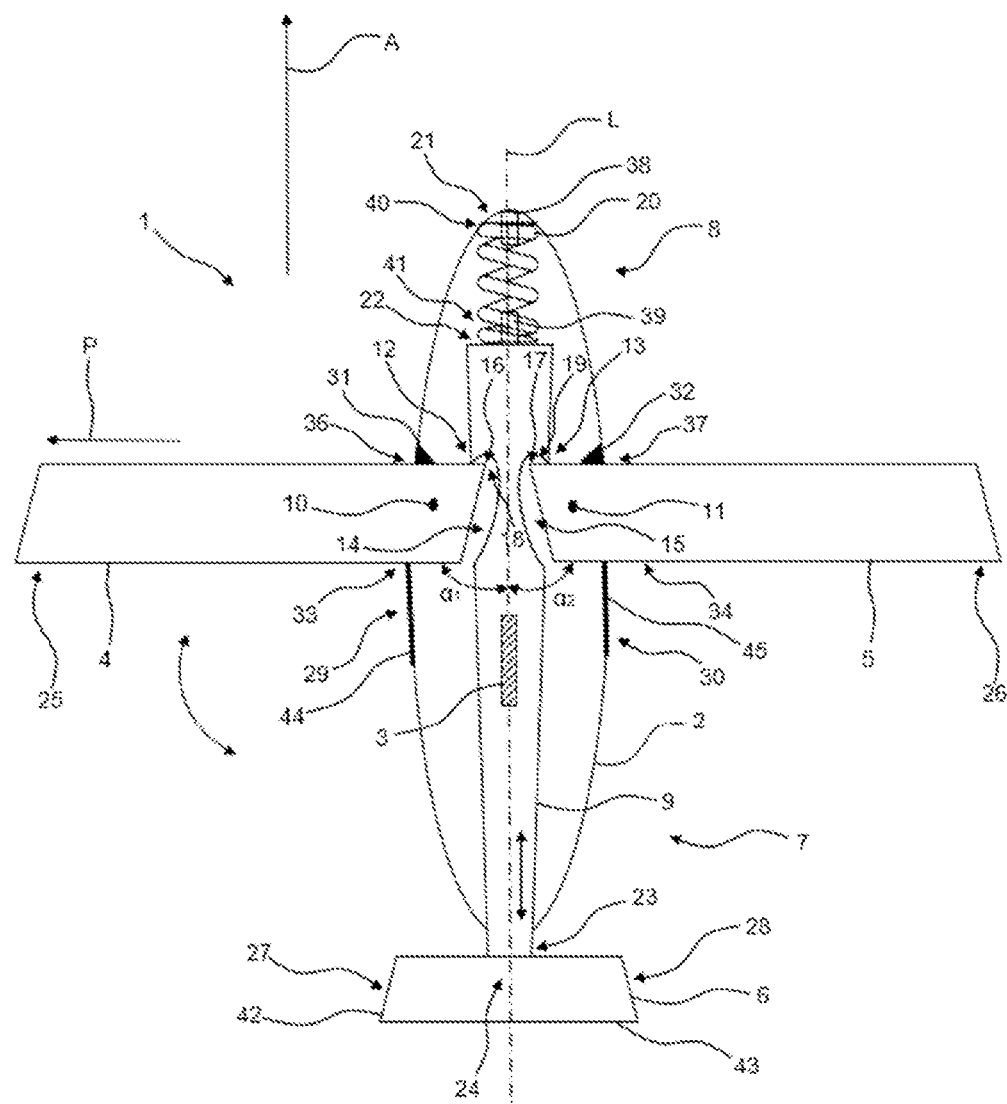
FIG. 1 schematically illustrates a top view of a hydrofoil with extended wings, according to a first embodiment.

FIG. 1 illustrates a hydrofoil 1 (or foil) comprising a fuselage 2, a mast 3 designed for attachment to a watercraft and two wings 4, 5, including a first wing 4 and a second wing 5 positioned at a front part 8 of the fuselage 2.

The terms "front" and "rear" are defined in relation to the normal direction of travel A of the hydrofoil 1 in the water.

The fuselage 2 extends along a longitudinal axis L. The mast 3 is perpendicular to the fuselage 2.

In one variant, the hydrofoil 1 can also include a tail 6 positioned at a rear section 7 of fuselage 2. The tail 6 can comprise a single fin or two fins 42, 43 running substantially parallel to the two wings 4, 5.

Wings 4, 5 and tail 6 are designed to provide hydrodynamic lift to hydrofoil 1 as it moves through the water in direction A.

The wings 4, 5 are substantially perpendicular to the mast 3.

The tail 6 can comprise a fin substantially perpendicular to the wings 42, 43.

Alternatively, wings 4, 5 can form an angle with mast 3 which is different from 90°. This angle can be between 89° and 80° or between 91° and 100°, for example.

The watercraft can be a boat, a sailboard, a stand-up paddle board, a surfboard, a kiteboard, a wingsurf board or a windsurf board, for example.

According to the invention, the two wings 4, 5 are folded towards the fuselage 2 by the water pressure exerted on the wings 4, 5 when the hydrofoil 1 moves through the water in the direction of travel A, preferably at very high speed.

More precisely, the two wings 4, 5 are rotatable relative to the fuselage 2 between a deployed position and a retracted position towards a rear part 7 of the fuselage 2. The deployed position corresponds to a substantially perpendicular positioning of the two wings 4, 5 with respect to the longitudinal axis L, as illustrated in FIG. 1, when the speed of the hydrofoil 1 is zero or low.

When the watercraft, and therefore the hydrofoil 1, is stationary, the two wings 4, 5 are preferably perpendicular to the longitudinal axis L of the fuselage 2. An angle $\alpha 1$ of approximately 90° is formed between the first wing 4 and the longitudinal axis L of the fuselage 2. Similarly, an angle $\alpha 2$ of approximately 90° is formed between the second wing 5 and the longitudinal axis L of fuselage 2. The two wings 4, 5 are aligned.

Figure 2:
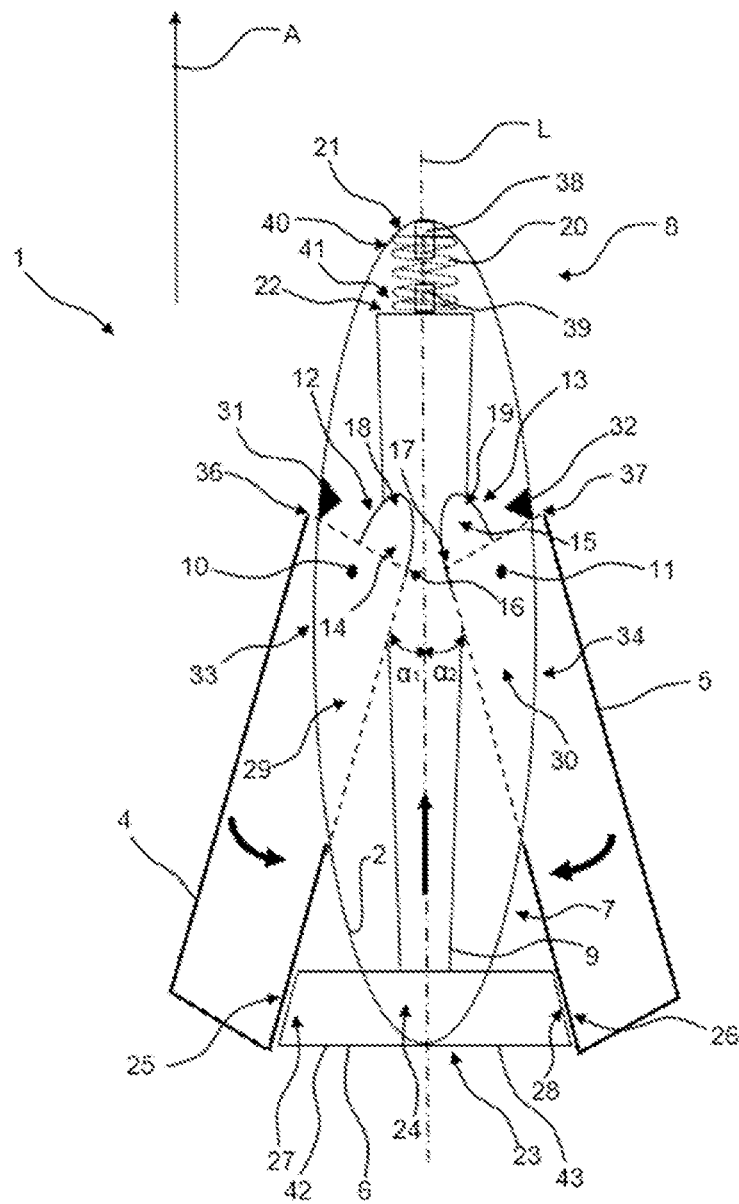
FIG. 2 schematically illustrates a top view of the hydrofoil illustrated in FIG. 1, with its wings retracted.

When the two wings 4, 5 are in the retracted position towards the rear part 7 of the fuselage 2, as shown in FIG. 2, i.e. when the speed of the hydrofoil 1 is greater than a minimum speed, the angles $\alpha 1$ and $\alpha 2$ are less than 90° and gradually decrease as the speed of the hydrofoil 1 increases.

Each of the two wings 4, 5 extends along a main direction P. More precisely, the angle $\alpha 1$ or $\alpha 2$ corresponds to the angle between the longitudinal axis L of the fuselage 2 and the main direction P of each of the two wings 4, 5.

According to the embodiment shown in FIGS. 1 and 2, the angles $\alpha 1$ and $\alpha 2$ are equal.

Alternatively, the two wings 4, 5 cannot be completely perpendicular to the longitudinal axis L of the fuselage 2 and can form an angle $\alpha 1$ or $\alpha 2$ slightly less than 90°, 85° for example, with the longitudinal axis L, when the watercraft is stationary.

As the speed of the watercraft increases, the pressure of the water on the wings 4, 5 causes them to fold in the direction of the rear part 7 of the fuselage 2, forming swept wings whose degree of sweep varies with speed.

The wings 4, 5 are mechanically connected to a mobile assembly 9, 9a, 9b which moves in translation inside the fuselage 2 along the longitudinal axis L and in relation to the fuselage 2 and the wings 4, 5.

Retraction of the two wings 4, 5 towards the fuselage 2 translates the mobile assembly 9, 9a, 9b towards the front part 8 of the fuselage 2. Deploying the two wings 4, 5 translates the mobile assembly 9, 9a, 9b towards the rear part 7 of fuselage 2.

The mobile assembly 9, 9a, 9b extends along longitudinal axis L.

As shown in FIGS. 1 and 2, the mobile assembly 9, 9a, 9b comprises a single rod-shaped mobile element 9.

The hydrofoil 1 comprises connecting devices 12, 13 connecting the wings 4, 5 to the mobile element 9 so as to allow simultaneous movement of both wings 4, 5 and to obtain substantially identical angles $\alpha 1$ and $\alpha 2$ for both wings.

Preferably, the connecting devices 12, 13 comprise two recesses 14, 15 hollowed out on either side of the mobile element 9, a first recess 14 receiving an inner end 16 of the first wing 4 and a second recess 15 receiving an inner end 17 of the second wing 5.

The inner end 16 of the first wing 4 forms a lever against a front portion 18 of the first recess 14 to push the mobile element 9 towards the front part 8 of the fuselage 2 when the speed of the hydrofoil 1 increases. By analogy, the inner end 17 of the second wing 5 also forms a lever against a front portion 19 of the second recess 15 to push the mobile element 9 towards the front part 8 of the fuselage 2 when the speed of the hydrofoil 1 increases.

Preferably, the inner end 16 of the first wing 4 and the inner end 17 of the second wing 5 form a point or have a rounded shape with a small radius of curvature.

The first wing 4 is rotatably mounted on the fuselage 2 about a first axis 10, and the second wing 5 is rotatably mounted on the fuselage 2 about a second axis 11.

The first axis 10 and the second axis 11 are positioned close to the respective inner ends 16, 17.

Alternatively, the connecting devices 12, 13 can comprise two gear sets (not shown), a first gear set associated with the first wing 4 and a second gear set associated with the second wing 5.

Each gear assembly comprises a first gear fixed to the inner end 16 of the first wing 4 cooperating with a second gear fixed to one of the sides of the mobile element 9.

The gears have curved or half-sphere shapes. The first gear has a counter-shape to the second gear. For example, the first gear has a concave shape and the second gear has a convex shape.

The hydrofoil 1 comprises compression devices 20, 20a, 20b connected to the mobile element 9 and opposing a resisting force to a force exerted by the water pressure on the wings 4, 5 during movement of the hydrofoil 1 so that the retraction of the wings 4, 5 is adapted to the speed of the hydrofoil 1.

Preferably, the compression devices 20, 20a, 20b are located at the front part of the fuselage.

The compression devices 20, 20a, 20b comprise at least one spring 20, 20a, 20b mounted in compression between a front end 21 of fuselage 2 and a front end 22 of mobile element 9.

The compression devices 20, 20a, 20b are calibrated according to the desired performance.

In the example shown in FIGS. 1 and 2, the compression devices 20, 20a, 20b comprise a single spring 20.

The spring 20 tends to push the mobile element 9 towards the rear part 7 of the fuselage 2.

Retraction of wings 4, 5 takes place from a minimum speed of hydrofoil 1 (or threshold). The water pressure on wings 4, 5 must be sufficient to compress spring 20.

The minimum speed can be one knot, for example.

The angles α1 and α2, and therefore the level of lift and drag, depend on the spring 20 setting or its stiffness coefficient.

In one embodiment, the front end 21 of fuselage 2 comprises a first lug 38 into which a first end 40 of spring 20 is inserted. A second lug 39 is provided at the front end 22 of the mobile element 9 for inserting and holding a second end 41 of the spring 20.

Alternatively, the compression devices 20, 20a, 20b can be replaced by a return device such as a return spring connected to the front end 22 of the mobile element 9 and to the rear part 7 of the fuselage 2.

Alternatively, the compression devices 20, 20a, 20b can be a hydraulic, pneumatic or gas (nitrogen) cylinder, for example.

Alternatively, the compression devices 20, 20a, 20b can be positioned in the mast 3.

According to one embodiment, the tail 6 is non-removably attached to the rear part 7 of the fuselage 2.

In another embodiment, the tail 6 is attached to a rear end 23 of the mobile element 9, so that the tail 6 can be moved in translation between a deployed position when the wings 4, 5 are deployed, and a retracted position towards the fuselage 2 when the wings 4, 5 are retracted.

In this way, the tail 6 follows the translational movement of the mobile assembly 9 along the longitudinal axis L.

The overall length of the hydrofoil 1 can be reduced by a translational movement to bring the fins 42 of the tail 6 closer to the wings 4, 5, linearly, correlatively, synergistically and simultaneously with the progressive rearward orientation of the wings 4, 5.

The tail can cannot be partially retracted inside the fuselage.

The rear part 7 of fuselage 2 comprises a slot into which a inner part 24 of tail 6 is inserted when tail 6 is in retracted position.

At zero or low hydrofoil 1 speed, both wings 4, 5 are unfolded, and the tail 6 is fully extended out of fuselage 2.

As the speed of the hydrofoil 1 increases, both wings 4, 5 fold back towards the rear part of fuselage 2 and tail 6 partially retracts into the rear part 7 of fuselage 2, further reducing lift and drag in the water. Leading edges are further reduced.

In another embodiment, the tail 6 moves but does not retract into the rear part 7 of the fuselage 2.

Preferably, at maximum speed, when the wings 4, 5 are fully retracted and the tail 6 is in its fully retracted position, a lateral end edge 25 of the first wing 4 faces an edge 27 of a first fin 42 of the tail 6.

In the same way, a lateral end edge 26 of the second wing 5 faces an edge 28 of a second fin 43 of the tail 6.

The fuselage 2 comprises a first lateral slot 29 extending along the longitudinal axis L to allow a portion 33 of the first wing 4 to pass through and retract inside the fuselage 2 when the first wing 4 is in the retracted position.

In the same way, the fuselage 2 comprises a second lateral slot 30 extending along the longitudinal axis L to allow a portion 34 of the second wing 5 to pass through and retract into the fuselage 2 when the second wing 5 is in the retracted position.

The first lateral slot 29 comprises a stop 31 at a front end 36 of the first lateral slot 29.

The second side slot 30 comprises a stop 32 at a front end 37 of the second side slot 30.

Advantageously, the side slots 29, 30 are each delimited by a fairing 44, 45 projecting outwards from the outer surface of the fuselage 2 and covering part of the wings 4, 5 to ensure aerodynamic continuity between the fuselage 2 and the wings 4, 5.

Figure 3:
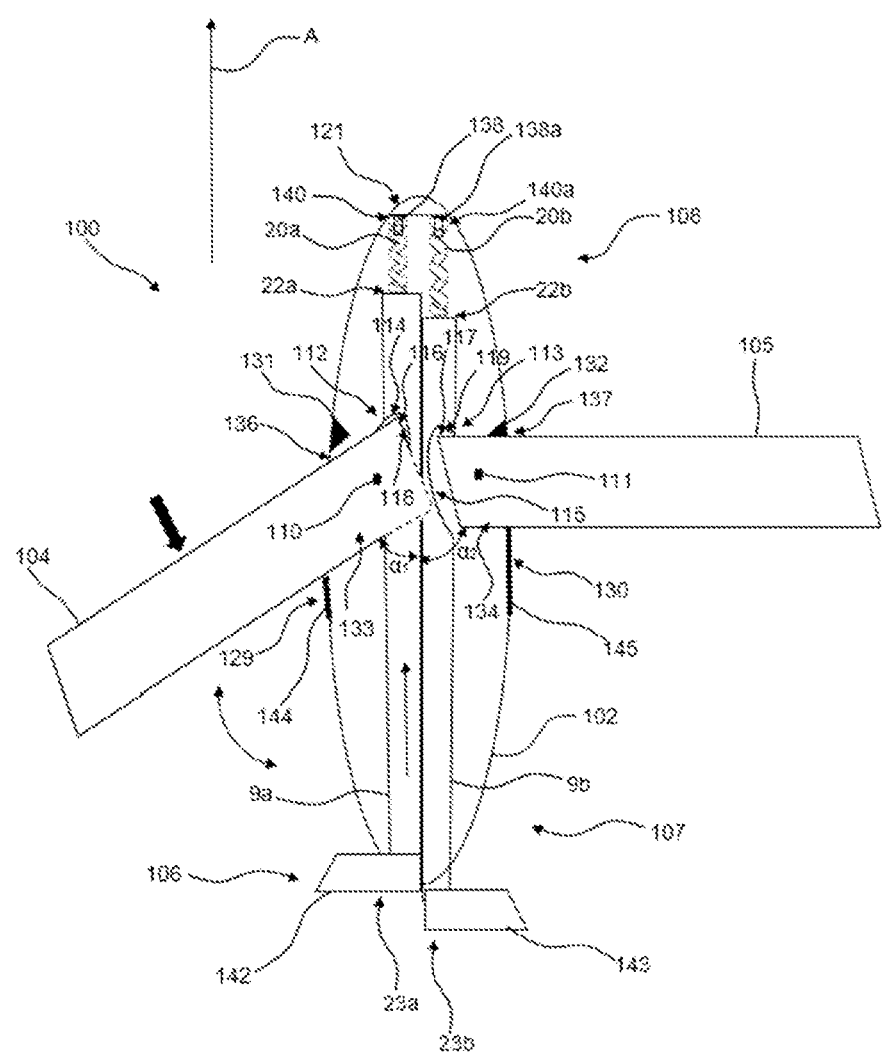
FIG. 3 schematically illustrates a top view of a hydrofoil with extended wings, according to a second embodiment.

In another embodiment shown in FIG. 3, the mobile assembly 9, 9a, 9b comprises a first mobile element 9a actuated by a first wing 104 and a second mobile element 9b actuated by a second wing 105.

The first wing 104 is rotatably mounted on the fuselage 102 around a first axis 110 and the second wing 105 is rotatably mounted on the fuselage 102 around a second axis 111.

The first mobile element 9a and the second mobile element 9b are separate and move independently of each other.

First connecting device 112 mechanically connect the first wing 104 to the first mobile element 9a, and second connecting device 113 mechanically connect the second wing 105 to the second mobile element 9b.

Preferably, the connecting devices 112, 113 comprise two recesses 114, 115 on either side of the mobile elements 9a, 9b, with a first recess 114 receiving an inner end 116 of the first wing 104 and a second recess 115 receiving an inner end 117 of the second wing 105.

The inner end 116 of the first wing 104 forms a lever against a front portion 118 of the first recess 114 to push the first mobile element 9a towards the front part 108 of the fuselage 102 when the speed of the hydrofoil 100 increases.

By analogy, the inner end 117 of the second wing 105 also forms a lever against a front portion 119 of the second recess 115 to push the second mobile element 9b towards the front part 108 of the fuselage 102 when the speed of the hydrofoil 100 increases.

The hydrofoil 100 comprises a first compression device 20a connected to the first mobile element 9a and opposing a resisting force to a force exerted by the water pressure on the first wing 104 during the movement of the hydrofoil 100 so that the retraction of the first wing 104 is adapted to the speed of the hydrofoil 100 and to the trajectory followed by the watercraft.

The hydrofoil 100 also comprises a second compression device 20b connected to the second mobile element 9b and opposing a resisting force to a force exerted by the water pressure on the second wing 105 during the displacement of the hydrofoil 100 so that the retraction of the second wing 105 is adapted to the speed of the hydrofoil 100 and to the trajectory taken by the watercraft.

Preferably, the compression devices 20a, 20b are located at the front part of fuselage 2.

According to one possible embodiment, the first compression device 20a comprises a first spring 20a mounted in compression between a front end 121 of the fuselage 102 and a front end 22a of the first mobile element 9a.

The second compression device 20b comprises a second spring 20b mounted in compression between a front end 121 of the fuselage 102 and a front end 22b of the second mobile element 9b.

The springs 20a, 20b are calibrated according to requirements, and in particular to the desired lift/drag/speed ratio.

Preferably, springs 20a, 20b are identically calibrated and identical.

The springs 20a, 20b tend to push each of the mobile elements 9a, 9b independently towards the rear part 107 of the fuselage 102.

The retraction of the wings 104, 105 occurs from a minimum speed of the hydrofoil 100 (or threshold). Water pressure on wings 104, 105 must be sufficient to compress springs 20a, 20b.

When the watercraft, and therefore the hydrofoil 100, is stationary, the two wings 104, 105 are preferably perpendicular to the longitudinal axis L of the fuselage 102. An angle α1 of approximately 90° is formed between the first wing 104 and the longitudinal axis L of the fuselage 102. Similarly, an angle 2 of approximately 90° is formed between the second wing 105 and the longitudinal axis L of the fuselage 102. The two wings 104, 105 are aligned.

As the speed of the craft increases, the water pressure on the wings 104, 105 causes compression of the springs 20a, 20b, causing the wings 104, 105 to retract towards the rear part 107 of the fuselage 102.

When the watercraft goes straight ahead, the retraction of the wings 104, 105 is identical and therefore the angles α1 and α2 are also identical.

However, when the watercraft turns to the right, as shown in the diagram in FIG. 3, the water pressure on the first wing 104 is greater than the water pressure on the second wing 105. The first spring 20a is more compressed than the second spring 20b. The first wing 104 is more retracted than the second wing 105.

The smaller the curvature of the turn to the right, the more the first wing 104 is folded. The angle α1 is therefore smaller than the angle α2. Lift and therefore drag in the water are stronger for the first wing 104 than for the second wing 105.

This principle is identical for a left turn with respect to the diagram in FIG. 3.

The angles α1 and α2 are therefore not always identical and depend on the direction of the hydrofoil 100 and the radius of curvature of the turn.

In this way, each of the wings 104, 105 is autonomous in the event of variation in the hydrofoil 100's trajectory, enabling control of the speed differential during turns.

The angles α1 and α2, and therefore the level of lift and drag, also depend on the spring settings 20a, 20b.

In one possible alternative, the front end 121 of fuselage 102 comprises a first lug 138 into which a first end 140 of first spring 20a is inserted. The front end 121 of fuselage 102 comprises a second lug 138a into which a first end 140a of second spring 20b is inserted.

In one embodiment, the tail 106 is non-removably attached to the rear part 107 of the fuselage 102.

In another embodiment, the tail 106 comprises two fins 142, 143 substantially parallel to the two wings 104, 105.

A first fin 142 is fixed to a rear end 23a of the first mobile element 9a so that the first fin 142 is mobile in translation between a deployed position when the first wing 104 is unfolded and a retracted position inside the fuselage 2 when the first wing 104 is retracted.

A second wing 143 is attached to a rear end 23b of the second mobile element 9b, so that the second wing 143 is mobile in translation between a deployed position when the second wing 105 is unfolded and a retracted position inside the fuselage 102 when the second wing 105 is folded.

In this way, the wings 142, 143 are independent and follow the translational movement of the respective mobile assemblies 9a, 9b along the longitudinal axis L.

The fuselage 102 comprises a first lateral slot 129 extending along the longitudinal axis L to allow a portion 133 of the first wing 104 to pass through and retract inside the fuselage 102 when the first wing 104 is in the retracted position.

In the same way, the fuselage 102 comprises a second lateral slot 130 extending along the longitudinal axis L to allow a portion 134 of the second wing 105 to pass through and retract into the fuselage 102 when the second wing 105 is in the retracted position.

The first lateral slot 129 comprises a stop 131 at a front end 136 of the first lateral slot 129.

The second side slot 130 comprises a stop 132 at a front end 137 of the second side slot 130.

Advantageously, the lateral slots 129, 130 are each delimited by a fairing 144, 145 projecting outwards from the outer surface of the fuselage 102 and covering part of the wings 104, 105 to ensure aerodynamic continuity between the fuselage 102 and the wings 104, 105.

The invention claimed is:

1. A hydrofoil intended for a watercraft, said hydrofoil comprising a fuselage and two wings arranged on either side of the fuselage and designed to provide hydrodynamic lift to the hydrofoil when it is moving through the water, wherein the two wings are rotatable relative to the fuselage between a deployed position when the hydrofoil is stationary and a retracted position towards a rear part of the fuselage by the water pressure exerted on the wings as the hydrofoil moves through the water, in the deployed position, the two wings are substantially perpendicular to a longitudinal axis (L) of the fuselage, in the retracted position, each of the two wings forms an angle with the longitudinal axis (L) when the speed of the hydrofoil is greater than a minimum speed, the angle being less than 90° and decreasing progressively as the speed of the hydrofoil increases, the hydrofoil comprising a mobile assembly translating inside the fuselage along the longitudinal axis (L) and relative to the fuselage, the wings being mechanically connected to said mobile assembly, the retraction of the two wings towards the fuselage causing translation of the mobile assembly towards a front part of the fuselage, and deployment of the two wings causing translation of the mobile assembly towards the rear part of the fuselage.

2. The hydrofoil according to claim 1, wherein the wings comprise a first wing rotatably mounted on the fuselage around a first axis and a second wing rotatably mounted on the fuselage around a second axis, the hydrofoil comprising connecting devices coupling the wings to the mobile assembly.

3. The hydrofoil according to claim 2, wherein the connecting devices comprise two recesses hollowed out on either side of the mobile assembly, of which a first recess receiving an inner end of the first wing and a second recess receiving an inner end of the second wing, the inner end of the first wing forming a lever against a front portion of the first recess to push the mobile assembly towards the front part of the fuselage as the speed of the hydrofoil increases, and the inner end of the second wing levering against a front portion of the second recess to push the mobile assembly towards the front part of the fuselage as the speed of the hydrofoil increases.

4. The hydrofoil according to claim 1, further comprising compression devices connected to the mobile assembly and opposing a resisting force to a force exerted by the water pressure on the wings as the hydrofoil moves, so that the retraction of the wings is adapted to the speed of the hydrofoil.

5. The hydrofoil according to claim 4, wherein the compression devices comprise at least one spring mounted in compression between a front end of the fuselage and a front end of the mobile assembly.

6. The hydrofoil according to claim 1, wherein the mobile assembly has an elongated shape following the longitudinal axis (L), the hydrofoil comprising a tail attached to a rear end of the mobile assembly so that the tail is mobile in translation between a deployed position when the wings are deployed and a retracted position towards the fuselage when the wings are retracted.

7. The hydrofoil according to claim 1, wherein the mobile assembly comprises a first mobile element actuated by water pressure on the first wing and a second mobile element actuated by water pressure on the second wing, the first mobile element and the second mobile element move independently of each other depending on the trajectory followed by the hydrofoil.

8. A watercraft comprising at least one hydrofoil as defined according to claim 1, the hydrofoil being attached to the watercraft by a mast.

* * * * *